May 21, 1940.                J. T. McINTYRE                2,201,270
APPARATUS FOR ALLAYING DUST FROM ROCK DRILLS
Filed April 10, 1937

Inventor
J. T. McINTYRE
By Young, Emery & Thompson
attys.

Patented May 21, 1940

2,201,270

UNITED STATES PATENT OFFICE 2,201,270

APPARATUS FOR ALLAYING DUST FROM ROCK DRILLS

John Taylor McIntyre, Johannesburg, Transvaal, Union of South Africa

Application April 10, 1937, Serial No. 136,203
In the Union of South Africa April 17, 1936

10 Claims. (Cl. 255—50)

This invention relates to the allaying of dust, particularly dust produced by drilling rock with percussive rock-drilling machines.

An object of the invention is to provide a dust collector of compact form including an ejector for creating a carrier current for the dust, which ejector is of high capacity and of such construction as to enable the dusty air to be thoroughly mixed, if desired, with a wetting medium.

A further object is to provide a collector which permits dry drilling while ensuring that the dust produced is safely collected and, if desired, wetted.

According to the invention, a dust collector provides an axial passage for dusty air, an annular ejector co-axial with the axial passage and arranged to withdraw the air therefrom, an annular collecting passage into which the ejector delivers, an outlet from said collecting passage and means for supplying motive fluid to the ejector. According also to the invention, a dust collector includes an annular ejector providing an annular chamber with means to feed motive fluid to it, a narrow annular nozzle at the outler perimeter of the chamber adapted to discharge the motive fluid outwardly as an annular jet and passages whereby dusty air is induced by the operation of the ejector to impinge laterally onto said annular jet. The collector may be mounted at the mouth of the drill hole to receive dusty air therefrom, air for creating the dust conveying current being supplied for instance down the bore of the hollow drill tool. In other cases the dusty air is aspirated up the bore of the drill and a dust collector is constructed and arranged accordingly.

The invention is illustrated in the accompanying drawing in which—

Figure 1:
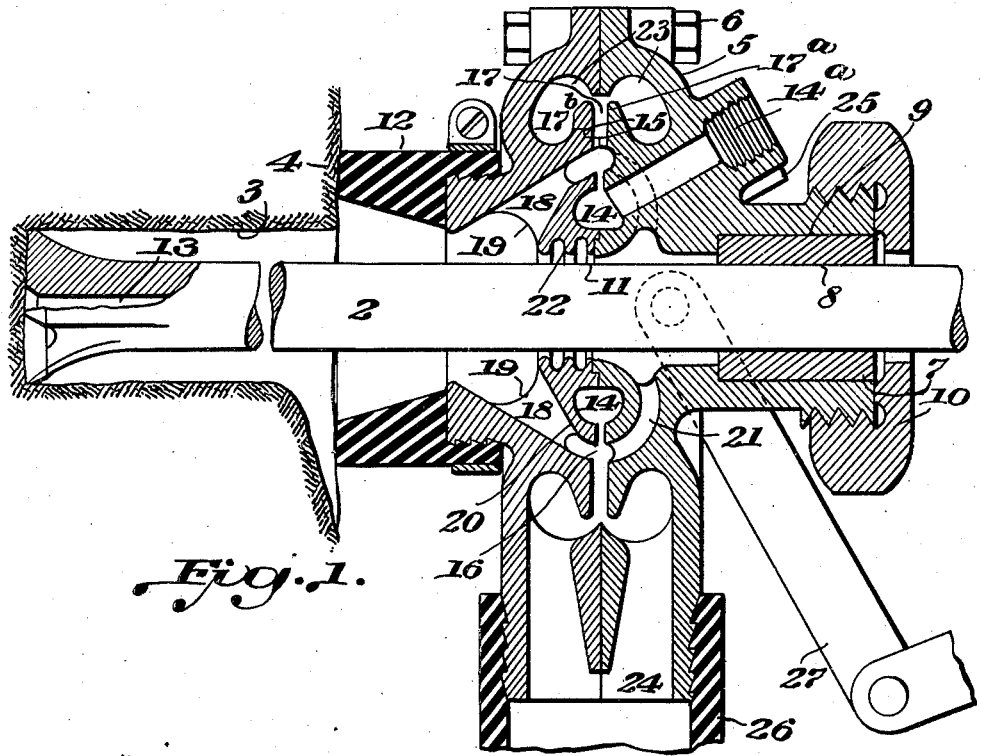
Figure 1 shows the collector in vertical section and in one of its positions of use.

Referring to Figure 1, 2 indicates the drill tool, and 3 the shot hole formed by it. 4 is the rock face about the collar of the hole 3. 5 is the dust collector which is conveniently moulded in halves which are separately produced and secured together by bolts 6. It is supported on the drill tool 2 by a bearing consisting of a wear-resisting sleeve 7 having an internal bore 8 which fits the tool 2 closely enough to minimize leakage of air through said bore; and rotatable in a socket 9 of the casing so that it may rotate with the drill tool. The sleeve is retained by the screw cap 10.

At the forward end of the collector provision is made for continuously withdrawing a stream of air from the bore hole 3. For this purpose there is provided an axial inlet passage 11 of substantially greater diameter than the drill tool, which passes through it. Said forward end of the collector may also be fitted with a rubber ring 12 which extends from it and makes a rough joint with the irregular rock face 4; a close joint at this point having been found in practice to be unnecessary.

Provision is made for admitting air to the bore hole 3 in order to provide the air stream which carries the dust produced by the drill, the admission being preferably arranged at or close to the bottom of the bore hole in order to keep the drill point clear of rock cuttings. If this is done, improved drilling speed may be expected, as compared with wet drilling. A convenient means for so admitting the air is to employ a hollow drill tool as shown and to provide for free admission of air to the tool bore 13 at some convenient rearward point, as by a lateral hole like the hole 29 shown in Figure 2 (or several of them) in the tool connecting with the bore, or by means of the axial tube 31 (Figure 3) which is often fitted in wet drilling machines for conveying water down the tool. It is desirable that the intake to the bore should be directly from the atmosphere and not under pressure, to ensure that the air pressure in the bore hole 3 is sub-atmospheric and thereby avoid any tendency of the dusty air in the bore hole to escape to atmosphere.

The interior construction of the collector includes an annular Venturi ejector. This comprises an annular chamber 14 to which the motive pressure fluid—conveniently compressed air—is fed by way of the pipe connection 14a; said motive fluid being conveniently compressed air to which as a rule water or other wetting liquid is added through the second similar connection 25. Said chamber 14 is formed with an annular nozzle 16, say .005 inch wide, from which the motive fluid is discharged as a jet of annular sheet-like form. Said jet is discharged into the annular Venturi throat 17, provided by the two annular flanges 15. In the example shown the greater circumferential length of the outer end 17a of the throat 17 as compared with that of its inner end 17b (the diameter of which is smaller than that of the aforesaid outer end 17a) provides the increase of area of the throat in the direction of flow necessary to produce the Venturi tube action.

The dusty air is fed from the axial passage 11 to the Venturi throat through the passage 18 which is annular but interrupted by webs 19 for supporting the casing 20 of the chamber 14. The direction of the passage 18 is such that the dusty air flowing through it impinges laterally on the sheet-like jet from the nozzle 16 and is thereby thoroughly mixed with said jet; and, if the latter contains liquid, is well wetted by the liquid. Another passage 21 similar to passage 18 may be provided on the other side of the chamber 14 to make the air impinge onto the opposite face of the sheet. The wall of the portion of the passage 11 within the chamber 14 may be formed as a labryinth 22 which reduces the rate of flow of the dusty air passing it by making such flow turbulent; the object being to prevent dust being thrown by its momentum through the bore of the sleeve 7.

From the Venturi throat 17 the mixed dusty air and motive fluid pass into the annular collecting passage 23 leading to an outlet 24. Said collecting passage 23 is shaped in cross section as a circle, into which the throat opens tangentially or, as shown, as two interpenetrating circles to which the throat is a common tangent. The effect of this construction, when liquid is present, is to cause both dust and liquid to impinge onto the passage surfaces opposite the throat, which assists their mixing. Moreover the swirling motion set up in the circular cross section or sections of the passage 23, causes the dust and water to segregate together centrifugally from the air and so to become still more intimately mixed.

The outlet 24 is fitted with a hose 26 to convey the discharge to a suitable destination; for instance to an air filter when the dust is dry or to a settling bucket or a mine drain when mud is discharged as the result of wetting the dust.

The ejector may be made of, or some or all of its interior surfaces may be lined with rubber or other material specially resistant to abrasion by the dust or to deterioration by the liquid. It will be noted that the ejector can use wetting liquid which could not be used in a rock drilling machine by reason of its detrimental action on the latter.

When the drill is directed at a steep angle the weight of the collector and its hose is generally sufficient to keep it in position on the rock face. In other cases mechanical means are provided for that purpose such as the extensible arm 27 attached to the ejector and the drilling machine.

Figure 2:
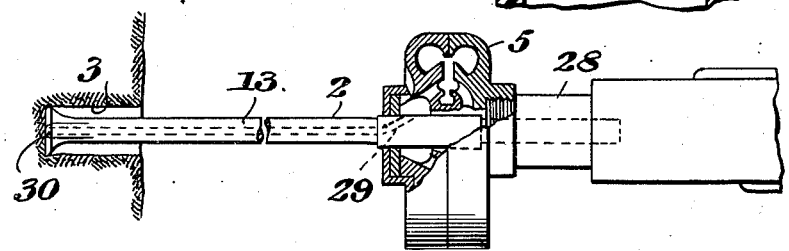
Figures 2 and 3 are views to a smaller scale showing a collector in other positions and structurally modified accordingly.

In alternative arrangements the dust produced in the shot hole is aspirated up the hollow drill tool 2. Figure 2 shows such an arrangement. A collector 5, preferably constructed essentially as described, is attached to the nose of the drilling machine 28. The bore 13 of the tool is stopped and terminates at a lateral hole 29, the tool cross section around the hole 29 being increased to counteract its weakening by said hole. The lateral hole 29 opens into the axial passage 11 of the collector and the air for the aspirating current is allowed to flow freely into the shot hole 3 from the atmosphere. The orifice 30 of the bore 13 at the point of the drill tool may be contracted relatively to the bore proper to ensure that any rock particle which passes it will be small enough to travel along the bore.

Figure 3:
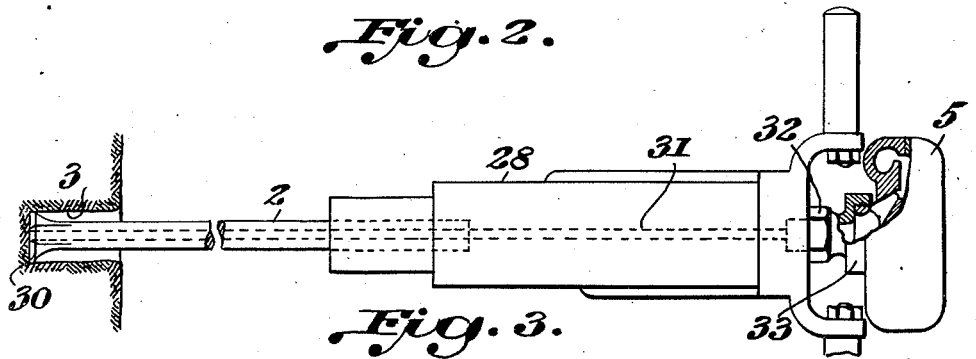

Figure 3 shows another position at which the collector 5 may be placed when dust is aspirated up the drill bore. In this case the collector is positioned at the rear end of the drilling machine 28 and connection to it from the tool bore 13 is made by an axial tube 31. The rear end of said tube is held, in the same way as the well known usual axial water tube, in a socket plug 32 which for the present purpose is provided with a screw threaded terminal 33 to which the ejector 5 is screwed.

I claim:

1. Apparatus for collecting dust produced in rock drilling comprising means defining an axial passage terminating at axial end openings whereby a rock-drill tool may be extended through it and forming an inlet for dusty air, an annular ejector through which passes a portion of the axial passage, said ejector providing an annular throat, and means forming passages on each side of the ejector connecting the axial passage with the throat on opposite sides of the latter.

2. A dust collector as claimed in claim 1, in which the interior surface of the ejector which defines the axial passage through it is of labyrinthine formation.

3. A dust collector including an annular ejector providing an outwardly directed annular nozzle and an annular throat into which the nozzle delivers, and, around the throat, an annular collecting passage the cross section of which is that of two intersecting circles, the throat being arranged to deliver at the common tangent of said circles.

4. A dust collector providing through it an axial passage adapted for a percussive drill tool to pass through it and comprising an annular ejector surrounding part of said passage; said collector having its forward end constructed to make a roughly air-tight point with said tool and socketed at its rearward end to seat on the nose of a drilling machine operating on said tool.

5. Apparatus for collecting dust produced in rock drilling comprising a casing defining an axial passage terminating at axial end openings whereby a rock-drill tool may be extended through it and forming an inlet for dusty air, said casing also providing an annular throat coaxial with said passage and in communication therewith so that dusty air may pass into the throat, and an annular segregating and collecting passage surrounding said throat, an annular chamber arranged within said casing and surrounding a portion of the axial casing passage, the annular chamber being closed at its internal perimeter facing said portion of the passage and having a narrow annular nozzle at its outer perimeter, said nozzle and throat forming an annular ejector, and means to supply motive fluid to said chamber.

6. Apparatus for collecting dust produced in rock drilling comprising a casing defining an axial passage terminating at axial end openings whereby a rock-drill tool may be extended through it and forming an inlet for dusty air, said casing also providing an annular throat coaxial with said passage and in communication therewith so that dusty air may pass into the throat, and an annular segregating and collecting passage which surrounds said throat and into which the throat enters tangentially, an annular chamber arranged within said casing and surrounding a portion of the axial casing passage, the annular chamber being closed at its internal perimeter facing said portion of the passage and having a narrow annular nozzle at its outer perimeter, said nozzle and throat forming an annular ejector, and means to supply motive fluid to said chamber.

7. Apparatus for collecting dust produced in rock drilling comprising a casing defining an axial passage terminating at axial end openings whereby a rock-drill tool may be extended through it and forming an inlet for dusty air, said casing also providing an annular throat co-axial with said passage and in communication therewith so that dusty air may pass into the throat, and an annular collecting passage surrounding said throat, an annular chamber arranged within said casing and surrounding a portion of the axial casing passage, the annular chamber being closed at its internal perimeter facing said portion of the passage and having a narrow annular nozzle at its outer perimeter, said nozzle and throat forming an annular ejector, and means to supply motive fluid to said chamber, means to supply a wetting fluid to the annular chamber, so that said wetting fluid may pass with the motive fluid through the throat and thereby mix with the dust, said collecting passage being arranged to segregate the mixture of dust and wetting agent from the motive fluid.

8. Apparatus for collecting dust produced in rock drilling, comprising means defining an axial passage terminating at axial end openings whereby a rock-drill tool may be extended through it and forming an inlet for dusty air, an annular ejector through which passes a portion of the axial passage, said ejector providing an annular throat, means forming passages on each side of the ejector connecting the axial passage with the throat on opposite sides of the latter, and an annular collecting passage around the throat, the collecting passage being circular in cross-section and the throat entering it tangentially; and means for supply motive fluid and a wetting fluid to the ejector.

9. Apparatus for collecting dust produced in rock drilling, comprising means defining an axial passage terminating at an axial end opening forming an inlet for dusty air, an annular ejector closed at its side facing said passage and providing an outwardly directed annular nozzle, an annular throat into which the nozzle delivers, means forming passages on each side of the ejector connecting the axial passage with the throat on opposite sides of the latter, and an annular collecting passage around the throat, the collecting passage being circular in cross-section and the throat entering it tangentially; and means for supplying motive fluid and a wetting fluid to the ejector.

10. Apparatus for collecting dust produced in rock drilling, comprising a casing defining an axial passage terminating at an axial end opening forming an inlet for dusty air, said casing also providing an annular throat co-axial with said passage and in communication therewith so that dusty air may pass into the throat, and an annular segregating and collecting passage surrounding said throat, an annular chamber arranged within said casing, said annular chamber being closed at its internal perimeter facing said passage and having a narrow annular nozzle at its outer perimeter, said nozzle and throat forming an annular ejector; and means to supply motive fluid to said annular chamber.

JOHN TAYLOR McINTYRE.